United States Patent Office 3,121,633
Patented Feb. 18, 1964

3,121,633
PROCESS OF MAKING PRINT-OUT IMAGES WITH CYANINE DYE BASES AND STYRYL DYE BASES
Robert H. Sprague and Peter W. Sprague, Chagrin Falls, Ohio, assignors to Horizons Incorporated, a corporation of New Jersey
No Drawing. Filed July 25, 1962, Ser. No. 212,444
6 Claims. (Cl. 96—48)

This invention relates to novel tribromoacetophenone compounds represented by the general formula

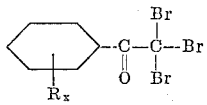

wherein R represents one or more monovalent radicals selected from the group consisting of nitro, halo, alkyl, haloalkyl, acetyl, haloacetyl, alkaryl, alkoxy, etc. and $x$ is an integer between 1 and 5, and to their use in free radical photosystems.

In an earlier filed United States patent application, serial No. 100,948, filed April 5, 1961, which issued on September 3, 1963, as United States Patent 3,102,810, there has been described a direct print-out photosystem based on light sensitive compositions which included at least one styryl dye base or at least one cyanine dye base, a source of halogen-containing free radicals, such as $CBr_4$; and a leuco triphenylmethane dye represented by the general formula

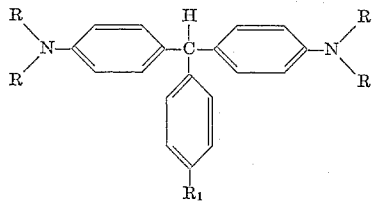

wherein each of the R's is selected from the group consisting of H, alkyl, aralkyl, and aryl and the several R's may be different and $R_1$ represents a monovalent radical selected from the group consisting of —H and

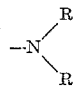

wherein each R has the same meaning as above, such as leuco Crystal Violet. As described in the above-noted pending patent application the styryl dye base or cyanine dye base-$CBr_4$-leuco Crystal Violet mixture is characterized by complete panchromatic responsive, a high degree of heat—intensifiability and the capability of yielding stable fixed images if subject to solvent extraction to remove one or more of the reactants from the system after exposure.

The present application is directed to novel tribromoacetophenone compounds which may be advantageously substituted for carbon tetrabromide as the halogen-containing free radical source in the above-noted photosystem and to such use of these novel tribromoacetophenone compounds.

The tribromoacetophenone compounds to which the present invention relates include the following acetophenones:

o-, m-, and p-nitro-$\alpha,\alpha,\alpha$-tribromo-
$\alpha,\alpha,\alpha$-Tribromo-
$\alpha,\alpha,\alpha$-M-tetrabromo-
$\alpha,\alpha,\alpha$-Tribromo 3,4-dichloro-
$\alpha,\alpha,\alpha$-Tribromo 2,5-dichloro-
$\alpha,\alpha,\alpha$-Tribromo 2,5-dimethyl
$\alpha,\alpha,\alpha$-p-Tetrabromo-
and $\alpha,\alpha,\alpha,\alpha',\alpha',\alpha'$-hexabromo-p-diacetylbenzene These and other tribromoacetophenones suitable for the photosystem described below may be represented by the following general formula

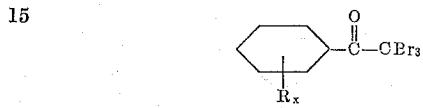

wherein R represents one or more monovalent radicals selected from the group consisting of nitro, halo, alkyl, haloalkyl, acetyl, haloacetyl, alkaryl, alkoxy, etc., and $x$ is an integer between 1 and 5.

It is to be understood that all of the R's need not be identical in any compound, and that the the examples which follow are indicative of but a few of the many novel compounds which may be prepared in the manner indicated and utilized in the photosystems hereinafter described.

EXAMPLE 1

Synthesis of $\alpha,\alpha,\alpha$-Tribromo-2,5-Dimethylacetophenone

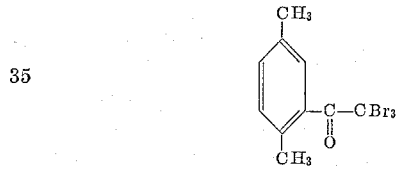

2',5'-dimethylacetophenone (148 grams) was placed in a 3000 cc. three-necked flask equipped with a dropping funnel and a length of glass tubing (for use as an exhaust system to remove the HBr) and a stirring motor. Five-hundred grams of bromine in 400 cc. of acetic acid were added slowly with rapid stirring. After the reaction had started it was necessary to cool the flask to 0° C. with an ice bath to prevent decomposition of the mixture. During the reaction the contents of the flask were exposed to ultraviolet radiation. When the decolorizing of the bromine had stopped, 300 grams of sodium acetate were added all at once to the mixture; and the mixture was stirred for one-half hour longer, at the end of which time it was poured into 4000 cc. of water.

A dark, oily layer separated from the water solution, and the water solution was extracted three times with ether until colorless. The ether solution was boiled until all ether had evaporated. At this point the product was in two layers, the top being water and the bottom a heavy yellow oil which was the desired product. These layers were separated in a dropping funnel.

The bottom layer was stirred in 2000 cc. of a one-molar solution of NaOH; after several minutes of stirring the alkaline solution was decanted. An additional 500 cc. of the molar NaOH were added, and the alkali was removed by decantation after five minutes of stirring. At this time the oily product was almost crystalline. The product was diluted with 500 cc. of petroleum ether, whereupon it crystallized. The crystals were placed in an icebox under petroleum ether overnight. They were then filtered, washed with petroleum ether, and dried. After recrystallization from chloroform the crystals melted at 77–79°; yield 313.5 g., 80% of theory.

*Analysis.*—Calcd. for $C_{10}H_9Br_3O$: Br, 62.33%. Found: Br, 62.33%.

EXAMPLE 2

*Synthesis of m-Nitro-α,α,α-Tribromoacetophenone*

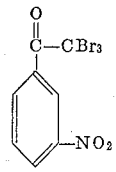

Forty-nine grams of m-nitroacetophenone were dissolved in 100 cc. of glacial acetic acid and placed in a three-necked 500 cc. flask with an air condenser and a dropping funnel. Bromine (142.6 grams) was mixed with an equal quantity of acetic acid, and the mixture was added dropwise as fast as possible without loss of bromine through the condenser. When approximately two-thirds of the bromine mixture was added the HBr stopped coming off, indicating that no further reaction was taking place. At this point, 100 grams of sodium acetate were introduced, and the rest of the bromine was added.

The mixture was then poured into 1000 cc. of cold water, and the oily product crystallized almost immediately and settled to the bottom. The mixture was filtered by suction and washed with water. At this stage the product was yellowish-white. It was then taken up in chloroform, filtered, and diluted with petroleum ether until the solution became turbid. After chilling the product was filtered and recrystallized again, as above. A yield of 73.7 grams, or 62%, of white crystals was obtained; M.P. 94–96° C.

*Analysis.*—Calcd. for $C_6H_4NO_2Br_3$: Br, 59.70. Found: Br, 59.83.

EXAMPLE 3

α,α,α-Tribromo-o-nitroacetophenone was prepared by dropping 16 grams of bromine dissolved in 16 cc. of acetic acid into 16.0 grams of o-nitroacetophenone dissolved in 25 cc. of acetic acid. After two-thirds of the bromine had been added with stirring, 36 grams of anhydrous sodium acetate were added. The rest of the bromine was then added. Up to the addition of the acetate, ultraviolet light was used to increase the speed of the reaction.

Upon diluting the reaction mixture with water, the product fell out as an oil, which later crystallized; yield 9 grams (55%), M.P. 99–101° C.

*Analysis.*—Calcd. for Br: 59.60. Found: Br, 60.00.

EXAMPLE 4

α,α,α-Tribromo-p-nitroacetophenone was prepared by dropping 16 grams of bromine mixed with 16 cc. of acetic acid into a solution of 16.5 grams of p-nitroacetophenone dissolved in 25 cc. of acetic acid. When two-thirds of the bromine solution was in, 28 grams of sodium acetate (anhydrous) were added. The rest of the bromine was then added. The reaction flask was exposed to an ultraviolet light during the first part of the reaction.

The product was in the form of yellowish crystals that melted at 95–103° crude state, and at 129–131° as purified by recrystallization from methyl alcohol; yield 17.2 grams (42.7%).

EXAMPLE 5

α,α,α-Tribromo-p-chloroacetophenone was prepared by dropping 96 grams of bromine (3 moles) dissolved in 30 cc. of acetic acid into 30.9 grams of p-chloroacetophenone (1 mole) with rapid stirring. When two-thirds of the bromine had been added, 60 grams of sodium acetate (anhydrous) were added with stirring. Ultraviolet light was used up to the last addition of bromine, which was carried out in the acetate solution.

The reaction mixture was then stirred for one-half hour longer, and the water-separated oil distilled under vacuum to yield the product, melting at 155–6° C.

*Analysis.*—Calcd. for Br: 61.30. Found: Br, 62.82.

EXAMPLE 6

α,α,α-m-Tetrabromoacetophenone was similarly prepared from 19.9 grams of m-bromoacetophenone and 48 grams of bromine. The product had a melting point of 35–36° C.

EXAMPLE 7

α,α,α-p-Tetrabromoacetophenone was similarly prepared from 49.8 grams of p-bromoacetophenone and 144 grams of bromine. The product had a melting point of 42–43°.

*Analysis.*—Calcd. for $C_8H_4Br_4O$: Br, 73.39. Found: Br, 73.26.

The utility of the foregoing derivatives of tribromoacetophenone is apparent from a comparison of the densities obtained when photosensitive compositions of the present invention were exposed along with similar compositions such as those described in the above-noted patent application serial No. 100,948, in which $CBr_4$ was utilized as the free radical source.

A photosensitive composition was prepared by simple mixing of the following:

| | | |
|---|---|---|
| 4-(p-dimethylaminostyryl) quinoline (D–8) | mg | 25 |
| Leuco Crystal Violet | mg | 25 |
| Carbon tetrabromide | g | 0.7 |
| Acetone | cc | 2 |
| Polystyrene (10% solution in benzene) | cc | 2 |

The composition was coated on a sheet of unsubbed Mylar terephthalate polyester (500–D) by means of a Bird applicator with a wet film thickness of 0.0015 inch. After drying in air, the film was exposed to the illumination of one reflector flood light (RFL 2) for 120 seconds at a film to lamp distance of 12 inches. Exposure was through a step tablet with Wratten filters placed side by side over the film. Densities were read through the green filter in an Eastman Model No. 1 color densitometer and were as follows:

TABLE I

| Step | Exposed Through Wratten Filter | | | | | |
|---|---|---|---|---|---|---|
| | 2B | Blue | Yellow | Clear | Green | Red |
| 1 | | | | | | |
| 2 | | | | | | |
| 3 | | | | | | |
| 4 | | | | .07 | | |
| 5 | | | | .08 | | |
| 6 | | | | .10 | | |
| 7 | .13 | | | .12 | | |
| 8 | .13 | | | .12 | | |
| 9 | .15 | | .10 | .15 | | |
| 10 | .17 | | .11 | .18 | | |
| 11 | .26 | .08 | .12 | .26 | | |
| 12 | .31 | .11 | .12 | .37 | | |
| 13 | .41 | .11 | .20 | .46 | .08 | |
| 14 | .46 | .11 | .30 | .60 | .08 | |
| 15 | .60 | .15 | .38 | .78 | .13 | .09 |
| 16 | .75 | .20 | .50 | .96 | .15 | .13 |
| 17 | .98 | .24 | .66 | 1.16 | .20 | .20 |
| 18 | 1.20 | .30 | .85 | 1.43 | .28 | .32 |
| 19 | 1.36 | .35 | 1.12 | 1.73 | .42 | 43 |
| 20 | 1.67 | .43 | 1.34 | 1.81 | .54 | .61 |
| 21 | 1.81 | .52 | 1.45 | 2.15 | .65 | .79 |

The table sets forth densities resulting from a 2-minute photoflood exposure of the above described 4-(p-dimethylaminostyryl) quinoline/leuco Crystal Violet/carbon Tetrabromide coating on Mylar film under a twenty-one step silver tablet, and also under the step tablet plus a series of filters —Wratten 2B (ultraviolet absorbing), 12 Yellow, 25 Red, 56 Green, and 47B Blue filters. The film was fixed in a solvent rinse after exposure to remove the colored sensitizer as well as the activator. These curves illustrate clearly that most of the sensitivity of this mixture is in the visible region, since there is relatively little difference between the response under the clear area as compared with that under the ultraviolet-absorbing 2B filter. The curves further show that a large proportion of the sensitivity to visible light is in the red and green regions of the spectrum, as demonstrated by the response under the yellow filter, which may be considered as a "minus blue" filter, transmitting the red and green components of white light freely.

An otherwise similar composition was prepared in which 0.2 g. of $\alpha,\alpha,\alpha$-tribromo-2,5-dimethylacetophenone was substituted for the carbon tetrabromide. The same wet coating thickness, on unsubbed 500–D Mylar, was exposed to the same source of light for 120 seconds at 12 inch lamp to film distance. Densities were read through the green filter in an Eastman Model No. 1 color densitometer and were as follows:

TABLE II

| Step | Exposed Through Wratten Filter | | | | | |
|---|---|---|---|---|---|---|
| | 2B | Blue | Yellow | Clear | Green | Red |
| 1 | | | | | | |
| 2 | | | | | | |
| 3 | | | | | | |
| 4 | | | | | | |
| 5 | .17 | | | | | |
| 6 | .17 | | | | | |
| 7 | .16 | | | .15 | | |
| 8 | .17 | | | .17 | | |
| 9 | .20 | | .16 | .18 | | |
| 10 | .26 | | .18 | .25 | | |
| 11 | .31 | | .22 | .34 | | .15 |
| 12 | .43 | | .27 | .43 | | |
| 13 | .55 | | .38 | .58 | .15 | .16 |
| 14 | .77 | .16 | .50 | .80 | .18 | .18 |
| 15 | 1.04 | .17 | .73 | 1.12 | .21 | .21 |
| 16 | 1.30 | .20 | 1.00 | 1.56 | .25 | .30 |
| 17 | 1.75 | .26 | 1.48 | 2.10 | .34 | .44 |
| 18 | 2.20 | .33 | 2.10 | 2.53 | .46 | .72 |
| 19 | 2.70 | .40 | 2.50 | 2.94 | .62 | 1.16 |
| 20 | 2.70 | .52 | 2.80 | 2.97 | .76 | 1.66 |
| 21 | 3+ | .63 | 2.96 | 2.98 | .94 | 2.47 |

It was found that a brief exposure to heat intensified the images obtained. The following densities were obtained by following the 120 second exposure to the reflector lamp with an exposure to an infrared lamp for 30 seconds at a lamp to film distance of 4 inches, the film composition being that containing tribromodimethylacetophenone, described above.

TABLE III

| Step | Exposed Through Wratten Filter | | | | | |
|---|---|---|---|---|---|---|
| | 2B | Blue | Yellow | Clear | Green | Red |
| 1 | | | | .14 | | |
| 2 | .18 | | | .15 | | |
| 3 | .18 | | | .17 | | |
| 4 | .19 | | | .18 | | |
| 5 | .18 | | .14 | .20 | | |
| 6 | .22 | | .17 | .22 | | |
| 7 | .27 | | .20 | .28 | .14 | |
| 8 | .34 | .16 | .24 | .35 | .15 | .16 |
| 9 | .43 | .18 | .30 | .47 | .18 | .19 |
| 10 | .55 | .19 | .40 | .65 | .20 | .19 |
| 11 | .65 | .20 | .49 | .84 | .23 | .25 |
| 12 | .86 | .24 | .72 | 1.05 | | |
| 13 | 1.07 | .24 | .90 | 1.34 | .30 | .33 |
| 14 | 1.30 | .26 | 1.20 | 1.67 | | .38 |
| 15 | 1.64 | .35 | 1.54 | 2.16 | .47 | .52 |
| 16 | 1.85 | .42 | 1.94 | 2.55 | .67 | .73 |
| 17 | 2.17 | .49 | 2.26 | 2.80 | .90 | 1.07 |
| 18 | 2.62 | .62 | 2.72 | 2.96 | 1.10 | 1.50 |
| 19 | 2.93 | .76 | 2.95 | 3+ | 1.36 | 2.00 |
| 20 | 2.96 | .96 | 3+ | 3+ | 1.60 | 2.47 |
| 21 | 3+ | 1.11 | 3+ | 3+ | 1.73 | 2.85 |

The effectiveness of other substituted tribromoacetophenones was evaluated by preparing 0.0015 inch wet thickness coatings on baryta coated paper subbed with polyvinylbutyral and on polyvinyl sheeting. The test solution contained the activator under test substituted on a gram for gram basis for $CBr_4$ in a test solution containing equal quantities of 4(p-dimethylaminostyryl) qunioline and leuco Crystal Violet in a 1% solution of ethyl cellulose in toluene.

TABLE IV

| Compound | Exposure Time in seconds to 101 Sensitometer | Observed Steps of the Eleven Step Wedge |
|---|---|---|
| Carbon Tetrabromide Control for comparison. | 5 | 2 steps. |
| p-Nitro-$\alpha,\alpha,\alpha$-tribromoacetophenone | 5 | 4th just visible. |
| o-Nitro-$\alpha,\alpha,\alpha$-tribromoacetophenone | 5 | 2d just visible. |
| m-Nitro-$\alpha,\alpha,\alpha$-tribromoacetophenone | 5 | 5–6. |
| $\alpha,\alpha,\alpha$-Tribromoacetophone | 4 | 4th just visible. |
| $CBr_4$ | 10 | 4 steps. |
| $\alpha,\alpha,\alpha$-m-Tetrabromoacetophenone | 10 | 6th just visible. |
| Carbon Tetrabromide Control for comparison. | 20 | 7th just visible. |
| $\alpha,\alpha,\alpha$-Tribromoacetophone | 20 | Do. |
| $\alpha,\alpha,\alpha$-Tribromo-3,4-dichloroacetophenone | 20 | 3d just visible. |
| $\alpha,\alpha,\alpha$-Tribromo-2,5-dichloroacetophenone | 20 | 2d just visible. |
| $\alpha,\alpha,\alpha,\alpha',\alpha'$-Hexabromo-p-diacetylbenzene | 20 | 4 steps. |
| $\alpha,\alpha,\alpha$-Tribromo-2,5-dimethylacetophenone | 20 | 7 steps. |
| $\alpha,\alpha,\alpha$-p-Tetrabromoacetophenone | 20 | Do. |

Instead of the specific styryl base dye utilized in the foregoing examples, any of the styryl dye bases or cyanine dye bases described in copending application Serial Nos. 42,233 and 95,031, filed July 12, 1960, March 13, 1961, respectively, and issued as United States Patents 3,095,303 and 3,100,703 on June 25, 1963, and August 13, 1963, respectively, may be used.

In addition to imparting an increased visible light sensitivity to leuco bases of triphenylmethane dyes, it has been found that as described in copending application Serial No. 134,862, filed August 30, 1961, the tribromoacetophenones increase the sensitivity of said leuco bases to light in the ultraviolet, to a markedly greater extent than the aldehydes, esters and simpler ketones therein noted.

Thus, the use of the activators of the present application in place of carbon tetrabromide or other previously known activators of the general formula R—C—$X_3$ wherein R represents a monovalent radical selected from the group consisting of H, Cl, Br, I, alkyl, haloalkyl, aryl and aralkyl and X is a halogen which may be either Cl, Br or I, produces a number of additional benefits.

First, it enhances the sensivity of the leuco base to both visible and ultraviolet light; secondly, it results in considerably increased speed and much improved contrast; and finally, the resulting image is readily intensified and is fixed to an appreciable extent by brief exposure to heat.

Having now described this invention in accordance with the patent statutes, it is not intended that it be limited except as may be required by the appended claims.

We claim:

1. A photosensitive composition consisting essentially of at least one dye base selected from the group consisting of styryl dye bases and cyanine dye bases, a leuco base of a triphenylmethane dye represented by the general formula

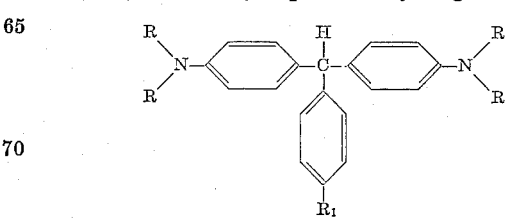

wherein each of the R's is selected from the group consisting of H, alkyl, aralkyl, and aryl and the several R's may be different and $R_1$ represents a monovalent radical selected from the group consisting of —H and

wherein each R has the same meaning as above, and a material which increases the sensitivity of said leuco base to visible and ultraviolet light, selected from the group consisting of $\alpha,\alpha,\alpha$-tribromoacetophenone and substituted $\alpha,\alpha,\alpha$-tribromoacetophenones represented by the formula

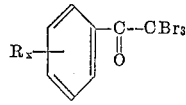

wherein $R_x$ represents at least one and not more than 5 substituents on the benzene ring and said substituents are selected from the group consisting of nitro, halogen, alkyl, haloalkyl, acetyl, haloacetyl, alkaryl and alkoxy.

2. The composition of claim 1 as a thin film.

3. The composition of claim 1 as a thin film supported by a carrier chemically inert to the constituents of said composition.

4. The composition of claim 3 wherein the carrier is paper.

5. The composition of claim 3 wherein the carrier is a film-forming plastic and the constituents of said composition are dispersed therein.

6. A method of producing a visible image which comprises: preparing a member including a thin layer containing a mixture consisting essentially of a leuco base of a triphenylmethane dye represented by the general formula

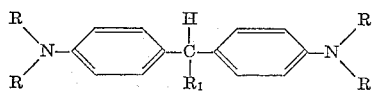

wherein each of the R's is selected from the group consisting of H, alkyl, aralkyl, and aryl and the several R's may be different, and $R_1$ represents a monovalent radical selected from the group consisting of —H and

wherein each R has the same meaning as above; at least one dye-base selected from the group consisting of styryl dye bases and cyanine dye bases; and as an activator enhancing the light sensitivity of said mixture, a tribromoacetophenone represented by the general formula

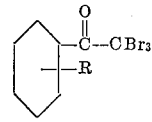

wherein R represents at least one and not more than 5 substituents on the benzene ring and wherein said substituents are selected from the group consisting of hydrogen, nitro, halogen, alkyl, haloalkyl, acetyl, haloacetyl, alkaryl, and alkoxy and wherein all of the substituents need not be identical; exposing said layer to a pattern of light and thereafter fixing the visible image produced by said exposure.

References Cited in the file of this patent

UNITED STATES PATENTS

| | | |
|---|---|---|
| 1,782,259 | Eggert et al. | Nov. 18, 1930 |
| 2,528,496 | Chalkley | Nov. 7, 1950 |
| 2,718,495 | Dazzi | Sept. 20, 1955 |
| 2,736,695 | Calfee et al. | Feb. 28, 1956 |
| 2,829,052 | Chalkley | Apr. 1, 1958 |
| 2,838,570 | Winterhalder | June 10, 1958 |
| 2,855,439 | Kundiger et al. | Oct. 7, 1958 |

OTHER REFERENCES

Sprague et al.: Photographic Science and Engineering, volume 5, No. 2, March-April 1961, pp. 98–103. (Copy in Sci. Library.)